July 21, 1964 L. A. KANDLE 3,141,698
REMOVABLE SIDE CONSTRUCTION FOR FLAT BED TRAILERS
Filed March 13, 1962 3 Sheets-Sheet 3

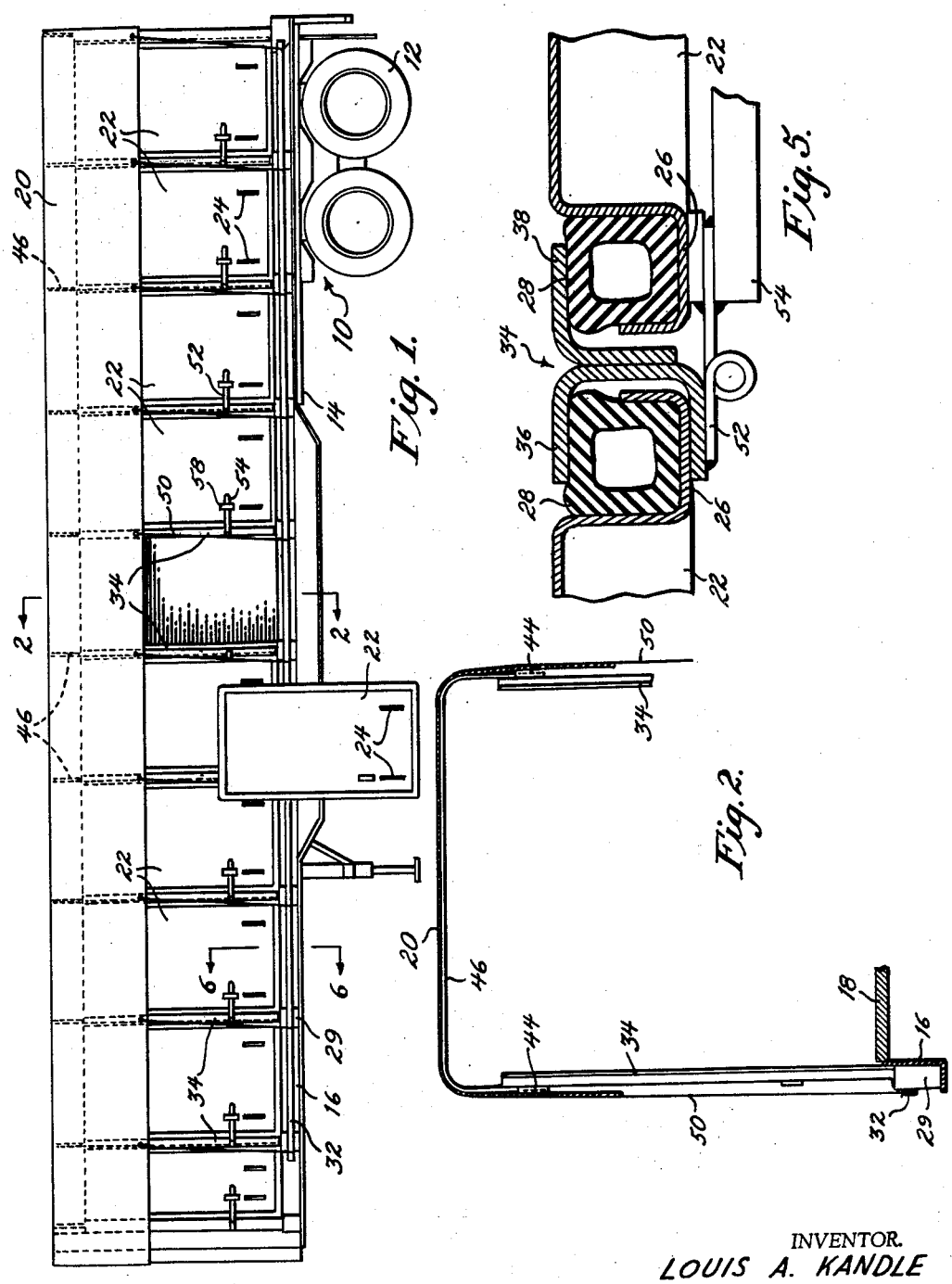

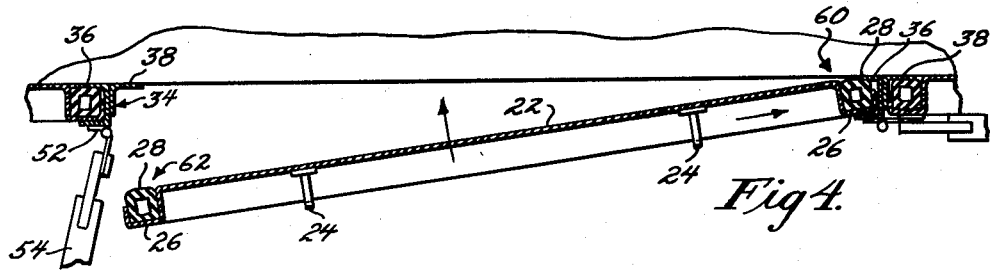
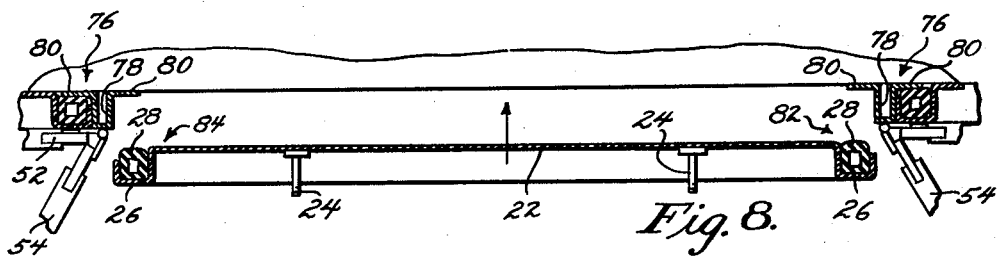
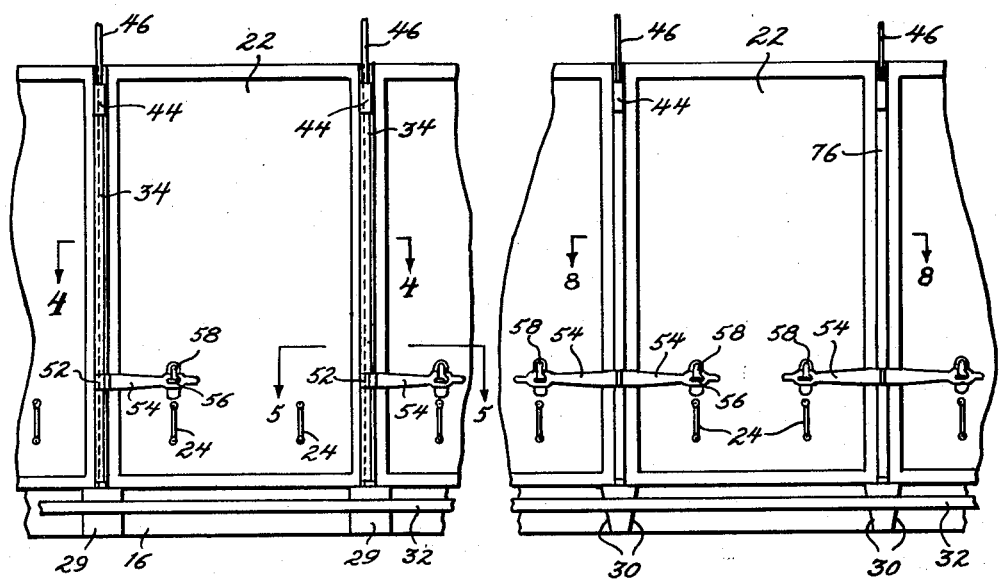
INVENTOR.
LOUIS A. KANDLE
BY
Mellman and Jacobs
ATTORNEYS.

INVENTOR.
LOUIS A. KANDLE
BY Millman and Jacobs
ATTORNEYS.

United States Patent Office 3,141,698
Patented July 21, 1964

3,141,698
REMOVABLE SIDE CONSTRUCTION FOR FLAT BED TRAILERS
Louis A. Kandle, Philadelphia, Pa., assignor to Strick Trailers, Philadelphia, Pa., a Division of Fruehauf Trailer Co., a corporation of Michigan
Filed Mar. 13, 1962, Ser. No. 179,368
6 Claims. (Cl. 296—36)

This invention pertains to flat bed vehicles and particularly flat bed trailers in which a removable side construction and a tarpaulin roof are generally used to contain the cargo which has been loaded on the bed or floor thereof.

Heretofore, the side construction was composed of heavy bulky racks which had to be lifted, for placement or removal, from the interior of the trailer thereby endangering cargo, personnel and even the racks themselves. Moreover, to remove cargo from an intermediate position required removal of all the racks to the rear thereof. In addition, the racks could not be removed without first wrestling back the tarpaulin and removing the roof bows exposed the cargo to inclement weather. The entire operation consumed considerable time and labor and subjected the racks, bows, tarpaulin and cargo to excessive wear and tear.

The primary object of the invention is to provide a removable side construction for flat bed vehicles which overcomes all of the disadvantages of the conventional construction noted above.

Another object is to provide a removable side construction for flat bed vehicles in which the side panels can be readily installed and removed by one person from ground level outside of the trailer thereby safeguarding the cargo.

Another object is to provide a removable side construction for flat bed vehicles in which one or more panels can be readily removed from a position exterior of the vehicle so that cargo can be unloaded from any intermediate point without the need to remove all rearward panels and without exposing the cargo to the elements as there is no need, in so doing, to roll back the tarpaulin.

Another object is to provide a removable side construction for a flat bed vehicle which is relatively simple and which lends itself to ease of manipulation for installation and removal.

The foregoing objects are attained by a construction which consists essentially of vertical posts removably secured in spaced relation along the sides of the flat bed vehicle, light weight side panels spanning the spaces between the posts and adapted to be positioned against adjacent posts from the outside of the trailer and means to releasably lock each panel in place. These objects will become more apparent from the following description when read in conjunction with the accompanying drawings, wherein:

FIGURE 1 is a side elevational view of a flat bed trailer with the removable side construction of the instant invention installed and showing a panel removed;

FIGURE 2 is a sectional view taken on the line 2—2 of FIGURE 1;

FIGURE 3 is an enlarged fragmentary side elevational view illustrating a side panel construction in detail;

FIGURE 4 is an enlarged sectional view taken on the line 4—4 of FIGURE 3 and illustrating the panel insertion position;

FIGURE 5 is an enlarged sectional view taken on the line 5—5 of FIGURE 3;

FIGURE 7 is a view similar to FIGURE 3 of a modification;

FIGURE 8 is an enlarged sectional view taken on the line 8—8 of FIGURE 7 and illustrating the panel insertion position;

Specific reference is now made to the drawings wherein similar reference characters are used for corresponding elements throughout.

Figure 6:
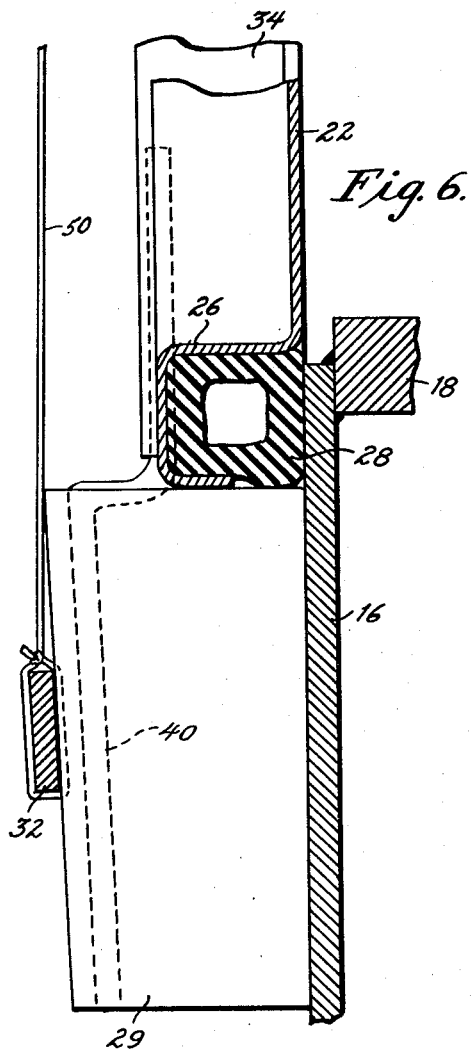
FIGURE 6 is an enlarged sectional view taken on the line 6—6 of FIGURE 1.
Figure 9:
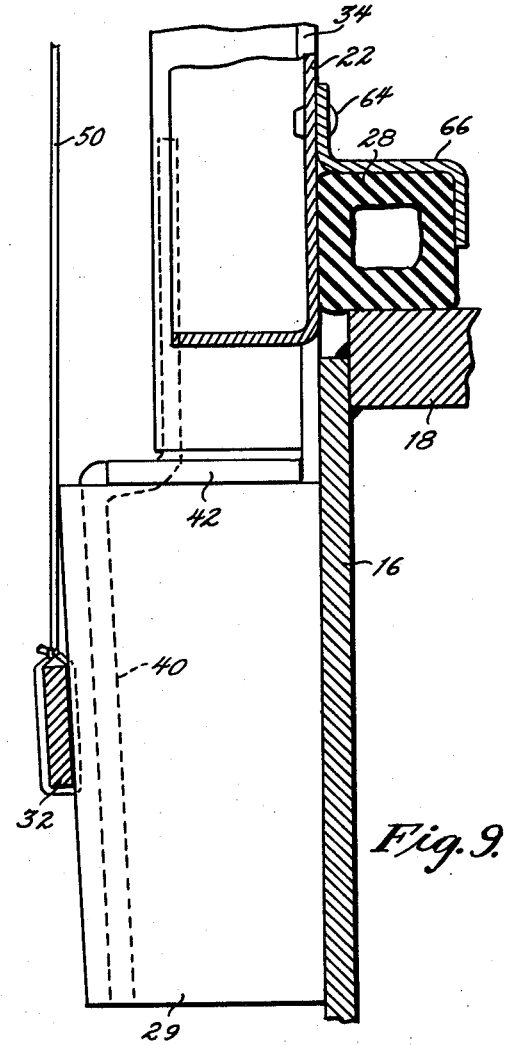
FIGURE 9 is a sectional view similar to FIGURE 6 but illustrating a different mode of supporting the side panel.
Figure 10:
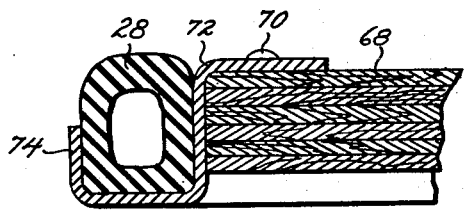
FIGURE 10 is a fragmentary sectional view of a modified form of side panel.

Indicated at 10 is a conventional flat bed trailer or like vehicle including running gear 12 mounted beneath a chassis or frame 14 equipped with longitudinal side rails 16 and a floor or flat bed 18 extending therebetween and supported by any suitable means on the chassis. Such a vehicle is laden with cargo and then the sides are put in place and a tarpaulin 20 secured thereover to contain the cargo.

The side panels 22 are substantially rectangular members of predetermined dimensions made of light weight material, such as plastic, aluminum, plywood, light gage steel or any combination thereof and provided adjacent their lower edges with appropriate handles 24 so that a single operator can comfortably lift each panel from the ground. The vertical and bottom edges of each panel are formed of channels 26 in which are secured weather sealing resilient strips or gaskets 28.

The side rails 16 are provided at longitudinally spaced intervals with open-end pockets 29 which can have straight side walls or inclined wedge walls 30. A longitudinal rub rail 32 is secured to the pockets. Vertical posts are provided for removable attachment into the pockets 29 whereby the panels 22 will span the spacing between the posts and be releasably attached thereto as will appear hereinafter.

Since two forms of posts are herein disclosed, attention is first called to the post 34 of FIGURES 1–6 and 9 which is shown in greater detail in FIGURE 5. The post which is also preferably fabricated of light weight metal or plastic comprises a generally U-shaped channel member 36 which opens sidewise and a substantially L-shaped member 38 which opens exteriorly of the vehicle, the L-shaped member being secured to the web of the channel member 36 either by spot welding or by being extruded therewith as a single unit. The lower end of the post is provided with an extension 40 which is inserted into the pocket 29. Where the pocket is wedge shaped as at 30, the extension can also be so shaped and the post is thereby retained therein. Where the pocket is square shaped, the lower end of the post can be provided with a pedestal 42 which rests on the upper edge of the pocket. At their upper ends the posts are provided with clips 44 removably retaining the ends of transversely extending roof bows 46 for supporting the tarpaulin 20.

Secured to the leg of the channel member 36 which faces exteriorly of the vehicle is a hinge unit 52, preferably of the piano type, which carries a latch bar 54 that is provided with a slot 56 engageable with a keeper 58 on the side panel 22. The latch bar is pivoted for horizontal movement across the L-shaped member 38 of the post.

In use, the operator inserts the posts in the pockets 29 and then the roof bows into the clips 44. Standing on the ground he lifts each panel by the handles 24 and inserts one vertical edge 60 (including channel 26 carrying the weather seal 28) into the channel member 36 of one post and then moves the other vertical edge 62 (including channel 26 carrying weather seal 28) into or against the L-shaped member of the adjacent post, as shown in FIGURE 4. Thereafter, the latch bar is moved across the edge 62 of the panel and made to engage the keeper 58. Then the tarpaulin is placed over the bows and the strings 50 thereof attached to the rub rails 32. Thus only one latch is required to retain a panel. Removal of a particular panel is simply effected by untying the tarpaulin strings of adjacent posts, releasing the latch bar and moving it to a position to clear the panel and then grasping the panel handles, pulling the vertical edge 62 away from the L-shaped member of one post and finally pulling the other vertical edge 60 of the panel generally diagonally out of the channel member 36 of the adjacent post.

It will be seen in FIGURE 6 that when the panel is in place, the weather seal 28 and a portion of the lower horizontal retaining channel 26 rests upon the upper edges of the stake pockets 29. In an alternate method shown in FIGURE 9, the lower end of the panel has secured thereto as at 64 a channel member 66 which faces inwardly of the vehicle and opens downwardly, the weather seal 28 being retained therein by suitable means, such as adhesive, and resting upon the floor 18.

The side panel can be modified by providing a multiply board 68 along the vertical edges of which are seccured as at 70 strips 72 providing open channels 74 in which the weather seals 28 are retained. Such a construction can also be employed horizontally along the lower edge of the panel.

In the form of the invention shown in FIGURES 7 and 8, the posts 76 are generally hat shaped in horizontal cross-section. That is, there is a central generally rectangular crown portion 78 and a pair of flanges 80 on both sides thereof forming the brim, the crown and brim facing exteriorly of the vehicle. In use, a panel is lifted by the handles and moved so that the vertical edges 82 and 84 thereof abut the flanges 80 of adjacent posts. To releasably retain the panel in place two hinged latch bars 54 are provided to extend across the vertical edges 82 and 84 of the panel and each panel is equipped with two keepers 58 to engage the latch bars, the latch bars and keepers being the same as those previously described. Thus in this form of the invention there is a little more freedom of movement of each panel in installation and removal but each post must be equipped with two latch bars, one for the panel to the right of the post and the other for the panel to the left of the post.

While a preferred embodiment of the present invention has been shown and described hereabove, it will be understood that skilled artistans may make minor variations without departing from the spirit of the invention and the scope of the appended claims.

I claim:

1. In a flat bed trailer, a removable side construction comprising vertical posts, means removably retaining said posts in longitudially spaced relation along the sides of the trailer, vertically extending panels spanning the spaces between said posts, said posts including means accessible from the exterior of the trailer removably receiving the vertical edges of said panels, and means releasably locking each panel in place, wherein said means accessible from the exterior of the trailer receiving the vertical edges of said panels includes a substantially L-shaped member along one vertical side of each post opening exteriorly of said trailer and a channel member along the other vertical side of and opening sidewise of said post, one vertical edge of each panel being received in the channel member of one post and the other vertical edge of the panel being received in the L-shaped member of an adjacent post.

2. The combination of claim 1 wherein said releasable locking means includes a keeper on each panel and a latch bar pivoted to each post for horizontal movement across that edge of the panel which is received in said L-shaped member and engaging said keeper.

3. In a flat bed trailer, a removable side construction comprising vertical posts, means removably retaining said posts in longitudinally spaced relation along the sides of the trailer, vertically extending panels spanning the spaces between said posts, each post being substantially hat shaped in horizontal cross-section and facing exteriorly of said trailer, the vertical edges of a panel engaging the brim portions of adjacent posts, and means releasably locking each panel in place including a pair of spaced keepers on a panel and a pair of latch bars pivoted to the crowns of adjacent posts for horizontal movement across the edges of said panel which are received in the brim portions of adjacent posts and engaging said keepers.

4. In a flat bed trailer, a removable side construction comprising vertical posts, means removably retaining said posts in longitudinally spaced relation along the sides of the trailer, vertically extending panels spanning the spaces between said posts, each post in horizontal cross-section including a substantially L-shaped member along one vertical side thereof and opening exteriorly of said trailer and a channel member along the other vertical side of said post and opening towards an adjacent post, one vertical edge of a given panel being received in said L-shaped member of one post while the other vertical edge of said given panel is received in the channel member of an adjacent post, and means releasably locking each panel in place.

5. In a flat bed trailer, a removable side construction comprising vertical posts, means removably retaining said posts in longitudinally spaced relation along the sides of the trailer, vertically extending panels spanning the spaces between said posts, each post including means along both vertical sides thereof accessible from the exterior of the trailer and removably receiving the vertical edges of adjacent panels, said means removably receiving the vertical edges of said panels including at least one substantially L-shaped member opening exteriorly of said trailer, and means releasably locking each panel in place.

6. In a flat bed trailer, a removable side construction comprising vertical posts, means removably retaining said posts in longitudinally spaced relation along the sides of the trailer, vertically extending panels spanning the spaces between said posts, each post including means along both vertical sides thereof accessible from the exterior of the trailer and removably receiving the vertical edges of adjacent panels, resilient sealing means carried by the vertical edges of said panels and engaged by said means along both vertical sides of said post, and means releasably locking each panel in place.

References Cited in the file of this patent

UNITED STATES PATENTS

| | | |
|---|---|---|
| 1,860,119 | Standish | May 24, 1932 |
| 1,893,532 | Ball | Jan. 10, 1933 |
| 2,324,508 | Johnson | July 20, 1943 |
| 2,525,542 | Grumbache | Oct. 10, 1950 |
| 2,579,774 | Akey | Dec. 25, 1951 |
| 2,639,187 | Grumbache | May 19, 1953 |
| 3,010,755 | Black | Nov. 28, 1961 |
| 3,022,106 | Black | Feb. 20, 1962 |